United States Patent
Sardo et al.

(10) Patent No.: US 6,403,139 B1
(45) Date of Patent: Jun. 11, 2002

(54) PROCESS FOR TREATING FRUIT AND VEGETABLES USING TOCOPHEROLS AS ANTIOXIDANTS

(75) Inventors: Alberto Sardo, Chateaurenard; Gilbert Bompeix, Paris, both of (FR)

(73) Assignee: Xeda International, Saint-Andiol (FR)

( * ) Notice: Subject to any disclaimer, the term of this patent is extended or adjusted under 35 U.S.C. 154(b) by 0 days.

(21) Appl. No.: 09/517,853

(22) Filed: Mar. 2, 2000

(30) Foreign Application Priority Data

Mar. 3, 1999 (FR) .............................................. 99 02643

(51) Int. Cl.$^7$ ................................................. A23L 3/00
(52) U.S. Cl. ........................ 426/541; 426/506; 426/615
(58) Field of Search ................................ 426/541, 615, 426/506

(56) References Cited

U.S. PATENT DOCUMENTS

| | | | |
|---|---|---|---|
| 4,832,969 A | 5/1989 | Lioutas | 426/270 |
| 5,376,391 A | 12/1994 | Nisperos-Carriedo et al. | 426/102 |

FOREIGN PATENT DOCUMENTS

| | | |
|---|---|---|
| EP | 0795272 | 9/1997 |
| WO | 91/05479 | 5/1991 |
| WO | 97/01288 | 1/1997 |

OTHER PUBLICATIONS

James, K., AN 292966 FROSTI, abstracting GB 2252713, May 1992.*

Hopkirk, G., AN 82(11):J1747 FSTA, abstracting Dissertation Abstracts International, B, 1981, 41(7), 2543.*

Hopkirk G.: "Involvement of lipids in the development of soft scald and other physiological disorders of apples" Dissertation Abstracts International, vol. 41, No. 7, 1981, p. 2543 XP002123579.

Patent Abstracts of Japan vol. 017, No. 496 (C–1108), Sep. 8, 1993 & JP 05 130830 A (Toppan Printing Co Ltd), May 28, 1993.

Patent Abstracts of Japan vol. 012, No. 015 (C–469) Jan. 16, 1988 & JP 62 171641 A (Nisshin Oil Mills Ltd: The), Jul. 28, 1987.

* cited by examiner

Primary Examiner—Leslie Wong
(74) Attorney, Agent, or Firm—Wenderoth, Lind & Ponack, L.L.P.

(57) ABSTRACT

The invention relates to a process for treating fruit and vegetables, including the steps of: bringing a liquid treating composition to a temperature of from 40 to 60° C., this composition containing, in an aqueous vehicle, one or more tocopherols which may be in the form of salts acceptable for food use; and applying the said treating composition to the fruit and vegetables by immersion or spraying, the immersion or spraying being continued for a time of less than or equal to 10 minutes, any process using, as treating composition, a composition containing one or more tocopherols in combination with a terpene chosen from eugenol, isoeugenol, their salts acceptable for food use and their mixtures being excluded from the context of the invention. This process is particularly suitable for treating lettuce, apples and pears after harvesting.

9 Claims, No Drawings

PROCESS FOR TREATING FRUIT AND VEGETABLES USING TOCOPHEROLS AS ANTIOXIDANTS

The present invention relates to a process for treating fresh fruit and vegetables.

BACKGROUND OF THE INVENTION

After harvesting, fresh fruit and vegetables are commonly stored, for a period which may be relatively long, before being placed on the market for consumption within a few days.

It is important for fruit and vegetables not to lose their qualities, in particular their appearance, during this storage period. This produce can be degraded, in particular by the proliferation of fungi at the surface of the fruit or vegetable, leading to rapid deterioration of the fruit or vegetable affected, by oxidation (in the case of cut lettuce) or by the phenomenon of "scald" which is reflected by blackening of the skin of the fruit or vegetables due to oxidized products, which accumulate in the waxy surface coat, this phenomenon possibly reaching down to the pulp of the fruit (in the case of apples and pears). These deteriorations are even faster if the fruit or vegetable has any small bruises consisting of nicks in the skin.

It is known practice to treat fruit and vegetables, before storage, with agents having antioxidant activity, so as to retard their degradation for as long as possible.

Among antioxidant substances which are known are many synthetic products such as diphenylamine; ethoxyquine; 3-tert-butyl-4-hydroxyanisole and 2-tert-butyl-4-hydroxyanisole (BHA); 2,6-di-tert-butyl-p-cresol (BHT); and tert-butylhydroquinone (TBHQ).

These compounds are usually applied to the fruit and vegetables at ambient temperature on account of their powerful antioxidant activity. However, they may present a certain level of toxicity to the consumer.

In order to overcome this drawback, patent application FR 96/03100 proposes a process for treating fruit and vegetables using natural substances, which are only scarcely effective or indeed ineffective at room temperature, namely polyphenols, as antioxidants. This process involves treating the fruit and vegetables at a temperature between 40 and 60° C.

More specifically, FR 96/03100 describes a process for treating fruit and vegetables, comprising the steps consisting in:
bringing a liquid treating composition to a temperature of from 40 to 60° C., this composition comprising, in an aqueous vehicle, at least one treating agent chosen from an antioxidant of polyphenol type, a terpenic compound and mixtures thereof, and
placing the fruit or vegetables in the liquid treating composition at the said temperature for a period of less than or equal to 10 minutes.

Thus, the process of FR 96/03100 has the effect of amplifying the low antioxidant power of polyphenols.

However, this process was found to be much less effective in the case of other antioxidant substances of natural origin, such as, for example, ascorbic acid (or vitamin C). Accordingly, in the case of ascorbic acid, the antioxidant activity is only very slightly increased by using a process comprising the hot (40 to 60° C.) application of the treating composition, compared with the activity observed by application at ambient temperature.

SUMMARY OF THE INVENTION

The present inventors have discovered, entirely unexpectedly, that tocopherols, which have very low antioxidant activity when applied at ambient temperature, show greatly amplified activity by hot application to fruit and vegetables.

This result is all the more unexpected since tocopherols have only one phenolic function, an assembly of lipophilic groups and virtually no activity at ambient temperature. Tocopherols are methyl derivatives of tocol, which has the formula:

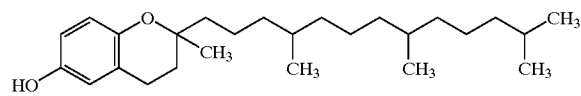

Thus, α-tocopherol is 5,7,8-trimethyltocol; β-tocopherol is 5,8-dimethyltocol; γ-tocopherol is 7,8-dimethyltocol; and δ-tocopherol is 8-methyltocol.

The invention is thus based on this discovery.

More specifically, the process of the invention comprises the steps consisting in:
bringing a liquid treating composition to a temperature of from 40 to 60° C., this composition comprising, in an aqueous vehicle, one or more tocopherols which may be in the form of salts acceptable for food use; and
applying the said treating composition to the fruit and vegetables by immersion or spraying, the immersion or spraying being continued for a time of less than or equal to 10 minutes.

The tocopherols which can be used according to the invention are those with antioxidant activity. Among these are α-tocopherol (or vitamin E), β-tocopherol, γ-tocopherol and δ-tocopherol. α-Tocopherol is a preferred tocopherol, whether it is used in its native form or in the form of one of its salts acceptable for food use.

In point of fact, the treating composition can comprise one or more tocopherols in the form of salt acceptable for food use. Salts which are particularly preferred are, in particular, the alkali metal salts such as the sodium salts, the lithium salts and the potassium salts.

The treating composition advantageously comprises α-tocopherol.

It should be understood that any process using, as treating composition, a composition comprising one or more tocopherols in combination with a terpene chosen from eugenol, isoeugenol, their salts acceptable for food use and their mixtures is excluded from the subject of the present patent application and thus from the protection sought.

According to the invention, the fruit and vegetables can be treated just after harvesting or during the period of conservation and storage of the fruit and vegetables. Preferably, this treatment is carried out just after harvesting. In any case, the process of the invention does not comprise a preliminary step of cooling the fruit and vegetables to the core by immersion or spraying using an aqueous cooling composition with a temperature of from 0 to 15° C.

In other words, before applying the hot treating composition, the fruit and vegetables treated are not subjected to a hydrocooling treatment with an aqueous composition having a temperature of between 0 and 15° C.

The process of the invention is particularly suitable for treating lettuce, apples and pears.

The process of the invention involves treating fruit and vegetables with an aqueous composition (designated as the treating composition) which has a temperature of between 40 and 60° C., preferably between 45 and 55° C. and better still between 48 and 52° C., for example 50° C.

The treating composition is advantageously in the form of a solution or dispersion in an aqueous vehicle.

Depending on whether the antioxidant active principle is more or less soluble in water, the composition can also additionally comprise at least one surfactant chosen, in a manner which is known per se, from non-ionic, anionic, cationic and amphoteric surfactants.

According to the invention, the treating composition comprises from 500 to 10000 ppm by weight of tocopherol (s) (optionally in the form of salts), preferably from 1000 to 5000 ppm, for example 3000 ppm.

The treating composition is applied to the fruit and vegetables either by immersion or by spraying.

The duration of this operation is very short, generally less than or equal to 10 minutes, in particular from 30 seconds to 10 minutes, advantageously from 30 seconds to 5 minutes. A contact time of from 2 to 3 minutes is usually sufficient.

The composition is preferably applied such that the amount of antioxidant used is from 2 to 40 g/tonne of fruit or vegetables treated.

When the duration of treatment with the desired hot composition is complete, the application can be terminated by any known means, in particular by simply stopping the spraying or removing the fruit or vegetables from the immersion tank. The fruit or vegetables can then be stored for subsequent distribution.

In one advantageous variant, in particular in the case of heat-sensitive fruit or vegetables, the process can also comprise a step consisting in rapidly cooling fruit or vegetables which have been placed in contact with the hot treating composition, bringing them down to a temperature below or equal to ambient temperature (15 to 25° C.).

This cooling can be carried out by circulating air or by contact with water (in particular immersion or spraying) whose temperature is less than or equal to ambient temperature.

Surprisingly, the process of the invention leads to a marked increase in the antioxidant activity of tocopherols.

This process is particularly advantageous since it uses natural substances which can be ingested without any danger to the consumer and since it allows the use of smaller amounts of an inexpensive active principle.

According to another of its aspects, the invention relates to the use of an aqueous treating composition brought to a temperature of from 40 to 60° C. and comprising, as antioxidant active principle, one or more tocopherols, which may be in the form of salt(s) acceptable for food use, for the antioxidant treatment of fruit and vegetables and in particular apples and pears. However, the use of a composition comprising a combination of tocopherol(s), which may be in the form of salts, with a terpene chosen from eugenol, isoeugenol, their salts acceptable for food use and their mixtures is excluded from the subject of the present invention.

The examples which follow illustrate the invention in further detail. In these examples, the treating composition, preheated to 50° C., is applied for 3 minutes to Granny Smith apples, by immersion or spraying.

In the examples which follow, ppm denotes parts per million by weight.

EXAMPLE 1

Anti-Scald Treatment on Apples by the Action of α-Tocopherol

Treating composition (Composition A) consists of water and 1500 ppm of α-tocopherol. The treatment is carried out by applying the treating composition, brought to 50° C., to the apples for 3 minutes.

The treated apples are then stored at ambient temperature (20° C.) for 8 days. The proportion of healthy apples, the proportion of apples for which less than 1 cm² of surface area is deteriorated by scald, and the proportion of apples for which more than 1 cm² of surface area is affected are then quantified.

The results obtained are given in the table below.

The control featured in this table relates to the results obtained in the case of untreated apples stored for 8 days at ambient temperature (20° C.).

This last study was carried out on the same number of apples as in the previous cases.

TABLE 1

| Treating composition | Healthy apples (%) | Apples affected to an extent of less than 1 cm² (%) | Apples affected to an extent of more than 1 cm² (%) |
| --- | --- | --- | --- |
| A | 83 | 2 | 15 |
| control | 47 | 4 | 49 |

EXAMPLE 2 (Comparative)

Anti-Scald Treatment on Apples by the Action of Polyphenols, Eugenol or Ascorbic Acid The treating compositions B to D below are prepared:

Composition B consisting of water and 5000 ppm of a concentrated spinach extract (comprising from 50 to 95% by weight of polyphenols).

Composition C consisting of water and 2500 ppm of eugenol.

Composition D consisting of water and 5000 ppm of ascorbic acid.

The apples are treated under the same conditions as in Example 1.

The results obtained are given in Table 2 below.

The control featured in this table relates to the results obtained in the case of untreated apples stored for 8 days at ambient temperature (20° C.).

This study was carried out on the same number of apples as in the preceding case.

TABLE 2

| Treating composition | Healthy apples (%) | Apples affected to an extent of less than 1 cm² (%) | Apples affected to an extent of more than 1 cm² (%) |
| --- | --- | --- | --- |
| B | 71 | 3 | 26 |
| C | 49 | 5 | 46 |
| D | 53 | 3 | 44 |
| control | 47 | 4 | 49 |

By way of additional comparison, the same amount of apples was treated with composition D maintained at ambient temperature (i.e. between 20 and 22° C.).

The apples thus treated were then stored for 8 days at ambient temperature (20° C.).

Following this treatment, the following counts were obtained:

45% of healthy apples;

4% of apples affected to an extent of less than 1 cm² (%);

51% of apples affected to an extent of more than 1 cm² (%)

These results clearly show the unexpected nature of the invention.

Whereas in the case of ascorbic acid, the application of the treating composition at 50° C. only slightly increases its antioxidant activity, the antioxidant activity of vitamin e (whose activity at ambient temperature is virtually zero) is found to be even greater, under the same treatment conditions, than that of polyphenols.

We claim:

1. A process for treating harvested fresh fruits and vegetables, comprising:

bringing a liquid treating composition to a temperature of from 40 to 60° C., the composition comprising, in an aqueous vehicle, one or more tocopherols which may be in the form of salts acceptable for food use; and applying the treating composition to the harvested fresh fruits and vegetables by immersion or spraying, the immersion or spraying being continued for a time of less than or equal to 10 minutes, with the exclusion of a process using, as treating composition, a composition comprising one or more tocopherols in combination with a terpene selected from eugenol, isoeugenol, their salts acceptable for food use and their mixtures.

2. Process according to claim 1, wherein the treating composition is brought to a temperature of between 48 and 52° C.

3. Process according to claim 1, wherein the treating composition comprises from 500 to 10000 ppm by weight of tocopherol(s).

4. Process according to claim 3, wherein the treating composition comprises from 1000 to 5000 ppm by weight of tocopherol(s).

5. Process according to claim 1, for the treatment of lettuce, apples and pears.

6. Process according to claim 1, wherein the treating composition comprises α-tocopherol optionally in the form of a salt acceptable for food use.

7. Process according to claim 6, wherein the salt acceptable for food use is an alkali metal salt.

8. A process according to claim 1, wherein the treating composition consists essentially of tocopherols as active ingredients in the composition.

9. A process according to claim 1, wherein the treating composition is devoid of sucrose esters, fatty acids, fatty acid esters, phospholipids, glyceride type lipids, polysaccharide polymers, and acidulants.

* * * * *